(12) United States Patent
Chen et al.

(10) Patent No.: US 9,227,325 B2
(45) Date of Patent: Jan. 5, 2016

(54) SUCTION DEVICE FOR VACUUM-LIFTING MULTIPLE TYPES OF WORKPIECES

(71) Applicants: SHENZHEN FUTAIHONG PRECISION INDUSTRY CO., LTD., Shenzhen (CN); FIH (HONG KONG) LIMITED, Kowloon (HK)

(72) Inventors: Ze Chen, Shenzhen (CN); Zhi-Jin Ma, Shenzhen (CN); Bing Yu, Shenzhen (CN); Jian-Ping Jin, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/549,749

(22) Filed: Nov. 21, 2014

(65) Prior Publication Data
US 2015/0151435 A1    Jun. 4, 2015

(30) Foreign Application Priority Data

Nov. 30, 2013 (CN) .......................... 2013 1 0622573

(51) Int. Cl.
*H01L 21/67* (2006.01)
*B25J 15/06* (2006.01)

(52) U.S. Cl.
CPC ................................ *B25J 15/0616* (2013.01)

(58) Field of Classification Search
USPC .................. 294/65, 183, 186, 188, 185, 907; 414/737, 912; 483/69; 901/40
See application file for complete search history.

(56) References Cited

U.S. PATENT DOCUMENTS

| 4,611,397 | A | * | 9/1986 | Janisiewicz et al. | ............... 294/2 |
| 4,723,353 | A | * | 2/1988 | Monforte | ....................... 414/737 |
| 4,799,854 | A | * | 1/1989 | Niskala | .......................... 414/737 |
| 5,201,696 | A | * | 4/1993 | Kinback et al. | ................ 294/183 |
| 5,385,441 | A | * | 1/1995 | Swapp et al. | .................. 414/627 |

* cited by examiner

*Primary Examiner* — Paul T Chin
(74) *Attorney, Agent, or Firm* — Novak Druce Connolly Bove + Quigg LLP

(57) ABSTRACT

A suction device includes a baseplate, a mounting board, and at least one suction assembly. The mounting board is spaced from the baseplate. The at least one suction assembly includes two bearings and a pole. The two bearings are secured on the baseplate and the mounting board, respectively. The pole is a hollow structure and passes through the two bearings. A suction head and a connection assembly are coupled to two opposite ends of the pole. The connection assembly connects to a vacuum pump to generate a vacuum in the suction head.

15 Claims, 4 Drawing Sheets

SUCTION DEVICE FOR VACUUM-LIFTING MULTIPLE TYPES OF WORKPIECES

FIELD

The disclosure generally relates to suction devices, and particularly relates to a suction device for vacuum-lifting multiple types of workpieces.

BACKGROUND

In assembly of electronic devices, such as mobile phones, multiple workpieces such as nuts usually need to be fixed to components of the electronic devices.

BRIEF DESCRIPTION OF THE DRAWINGS

Implementations of the present technology will now be described, by way of example only, with reference to the attached figures.

DETAILED DESCRIPTION

Figure 1:
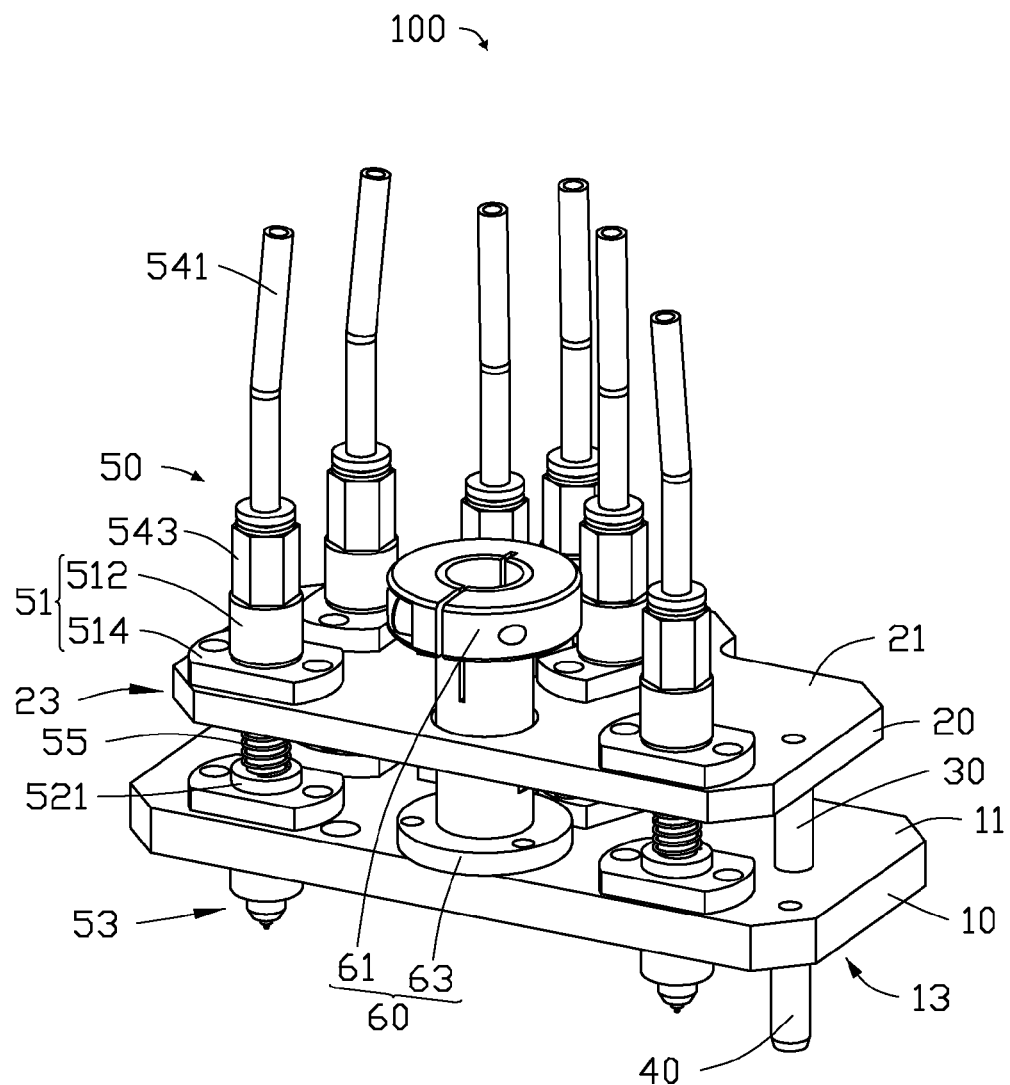
FIG. 1 is an assembled, isometric view of a suction device, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a suction device.

Figure 2:
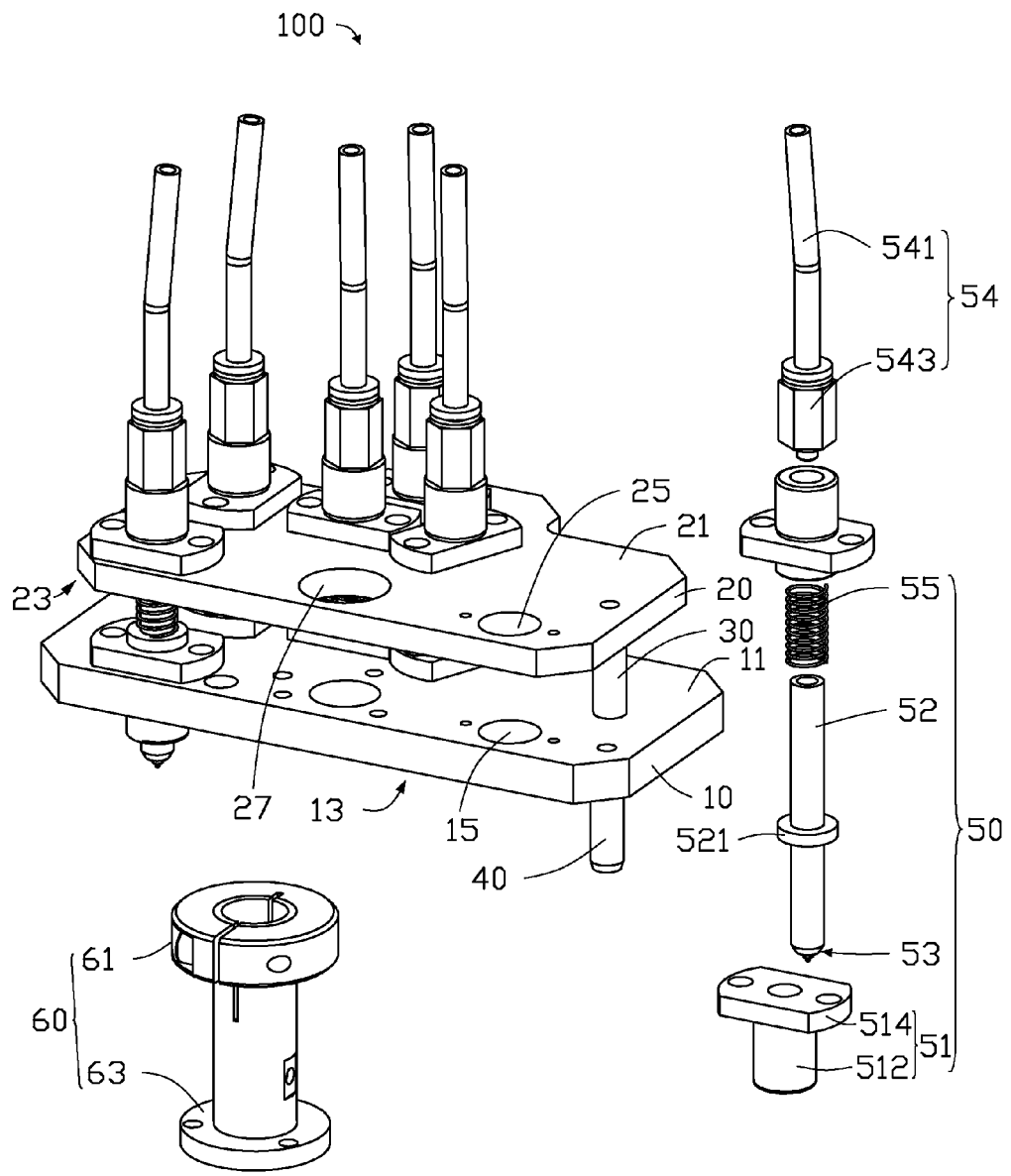
FIG. 2 is a partially exploded, isometric view of the suction device of FIG. 1.

FIGS. 1 and 2 illustrate an embodiment of a suction device 100, according to an exemplary embodiment. The suction device 100 is configured to vacuum-lift multiple types of workpieces, such as nuts. The suction device 100 includes a baseplate 10, a mounting board 20, a plurality of supporting columns 30, a fixing member 40, at least one suction assembly 50, and a barrel 60.

The baseplate 10 is substantially a rectangular board for fixing the suction assembly 50 and the fixing member 40. The baseplate 10 includes a first surface 11 and a second surface 13 opposite to the first surface 11. The fixing member 40 is secured on the second surface 12. The baseplate 10 defines at least one receiving hole 15 for receiving the suction assembly 50.

A shape of the mounting board 20 is similar to the baseplate 10. The mounting board 20 is disposed above the baseplate 10 for fixing the suction assembly 50 and the barrel 60. The mounting board 20 includes a top surface 21 and a bottom surface 23 opposite to the top surface 21 and facing to the first surface 11 of the baseplate 10. The suction assembly 50 is secured on the top surface 21. The mounting board 20 defines at least one mounting hole 25 for receiving the suction assembly 50 and a through hole 27 for receiving the barrel 60.

The plurality of supporting columns 30 are secured between the baseplate 10 and the mounting board 20. A first end of the supporting column 30 is secured on the first surface 11, and a second end of the supporting column 30 is secured on the bottom surface 23, thereby connecting the mounting board 20 to the baseplate 10 by the plurality of supporting columns 30.

The fixing member 40 has a cylindrical shape, which is fixed to the second surface 13. The fixing member 40 engages a fixture (not shown) to allow the suction device 100 to be positioned on the fixture. Thus, the suction device 100 can pick workpieces carried on the fixture.

Figure 3:
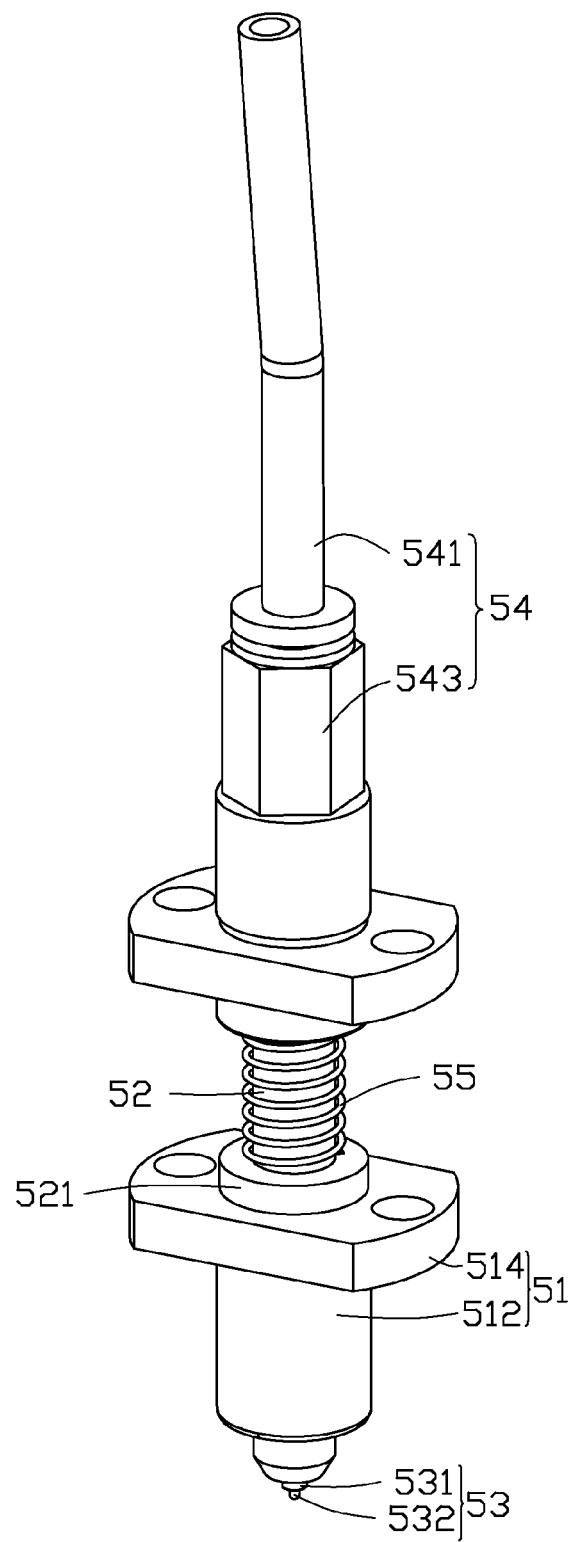
FIG. 3 is an assembled, isometric view of a suction assembly of the suction device of FIG. 1.
Figure 4:
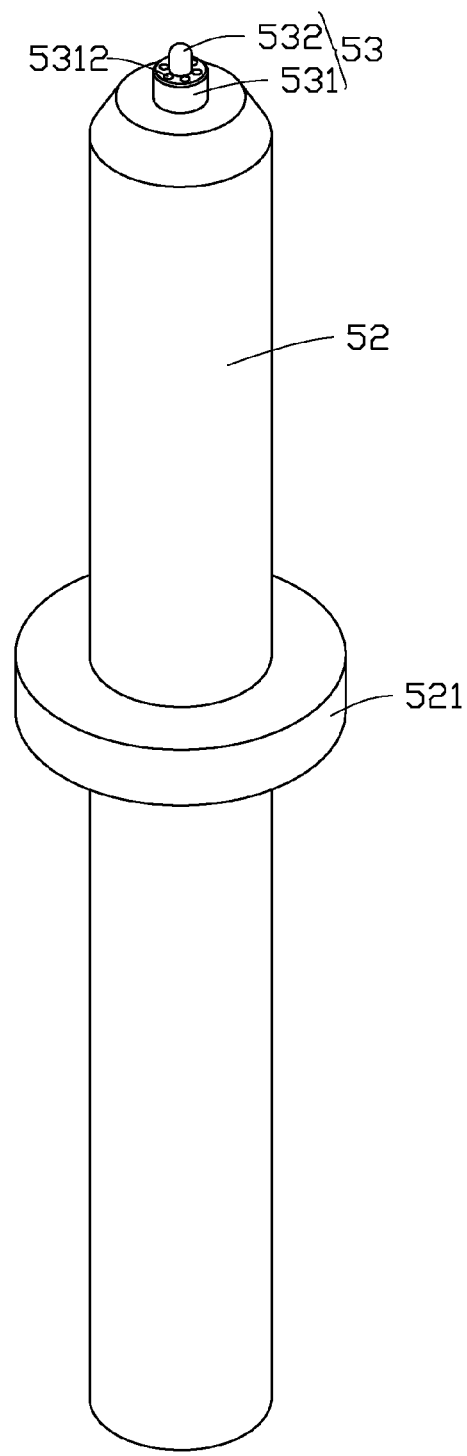
FIG. 4 is a diagrammatic view of a pole of the suction device of FIG. 1.

Also referring to FIGS. 3 and 4, the suction assembly 50 includes two bearings 51 and a pole 52. Each bearing 51 includes a sleeve 512 and a flange 514 connected to an end of the sleeve 512. One bearing 51 is secured on mounting board 21 via the engagement between the flange 514 and the top surface 21, and the sleeve 512 communicates with the mounting hole 25. Another bearing 51 is secured on the baseplate 10 via the engagement between the flange 514 and the first surface 11, and the sleeve 512 of the another bearing 51 passes through the receiving hole 15. The pole 52 can be a hollow structure, and protrudes a resisting portion 521 from a middle portion of the pole 52. The pole 52 passes through the two bearings 51, the receiving hole 15, and the mounting hole 25, the resisting portion 521 resists the flange 514 secured on the baseplate 10. Thus, the pole 52 cannot slide in the receiving hole 15 and the mounting hole 25.

In addition, a suction head 53 and a connection assembly 54 are connected to two opposite ends of the pole 52. The suction head 53 includes a suction portion 531 and a positioning block 532 formed at a center of the suction portion 531. The suction portion 531 defines a plurality of air holes 5312 surrounding the positioning block 532. The positioning block 532 is configured to press the workpieces. The connection assembly 54 includes a pipe 541 and a fastener 543. A first end of the pipe 541 is connected to pole 52 via the fastener 543, and a second end of the pipe 541 is connected to a vacuum pump (not shown) to create a vacuum inside the suction head 53, thereby enabling the workpieces to be absorbed by the suction portion 531.

The suction assembly 50 further includes a buffering member 55. In at least one embodiment, the buffering member 55 can be a spring spirally wound around the pole 52, and resists between the resisting portion 521 and the bearing 51 secured on the mounting board 20.

The barrel 60 connects the suction device 100 to a driving device, such as a manipulator (not shown). The barrel 60 passes through the through hole 27 and is secured on the baseplate 10. The barrel 60 forms a fastening portion 61 and a connection portion 63 at two opposite ends. The fastening portion 61 is firmly fixed to the driving device, and the connection portion 63 is secured on the first surface 11 of the baseplate 10.

In use, the suction device 100 is connected to a manipulator via the barrel 60, and the pipe 541 is connected to a vacuum pump. When the suction device 100 is actuated, the suction device 100 is moved by the manipulator, and is positioned on a fixture by the fixing member 40. Then, the positioning block 532 presses one of the workpieces carried on the fixture. The vacuum pump is turned on to create a vacuum inside the suction head 53, and then the suction head 53 vacuum-lifts the workpieces.

When the suction device 100 is moved towards an electronic device, such as a mobile phone, the vacuum pump is turned off to allow the workpieces to be dropped from the suction device 100. Thus, the workpieces can be mounted on the electronic device.

In summary, the suction assembly 50 is secured by the baseplate 10 and the mounting board 20, and includes the two bearings 51 and the pole 52. Since the pole 52 passes through the two bearings 51, the suction device 100 is guided by the pole 52, and thus is more steady. Additionally, since the suction device 100 includes at least one suction assembly 50, each suction assembly 50 is capable of picking one type of workpiece, therefore the suction device 100 can pick multiple and different workpieces, to avoid a plurality of manipulators being required. Thus, the suction device 100 reduces the cost of production and the volume of working space.

The embodiments shown and described above are only examples. Many details are often found in the art such as the other features of the case and the data read-write assembly using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A suction device comprising:
    a baseplate;
    a mounting board spaced from the baseplate; and
    at least one suction assembly comprising:
        two bearings secured on the baseplate and the mounting board, respectively; and
        a pole being a hollow structure and passing through the two bearings;
    wherein a suction head and a connection assembly are coupled to two opposite ends of the pole, the connection assembly connects to a vacuum pump to generate a vacuum in the suction head; and
    wherein the baseplate defines a receiving hole, the mounting board defines a mounting hole, the pole passes through the receiving hole and the mounting hole, the baseplate comprises a first surface and a second surface opposite to the first surface, the mounting board comprises a top surface and a bottom surface opposite to the top surface and facing to the first surface of the baseplate, the two bearings are secured on first surface and the top surface, respectively.

2. The suction device as claimed in claim 1, wherein the suction head comprises a suction portion and a positioning block formed on the suction portion, the suction portion defines a plurality of air holes surrounding the positioning block.

3. The suction device as claimed in claim 1, wherein the connection assembly includes a pipe and a fastener, a first end of the pipe is connected to the pole via the fastener, and a second end of the pipe is connected to the vacuum pump.

4. The suction device as claimed in claim 1, wherein each bearing comprises a sleeve and a flange connected to an end of the sleeve, one bearing is secured on the mounting board via the engagement between the flange and the top surface, and the sleeve communicates with the mounting hole, another bearing is secured on the baseplate via the engagement between the flange and the first surface, and the sleeve of the another bearing passes through the receiving hole.

5. The suction device as claimed in claim 4, wherein the pole protrudes a resisting portion resisting the flange secured on the baseplate.

6. The suction device as claimed in claim 5, wherein the suction assembly further comprises a buffering member, the buffering member is a spring spirally wound around the pole, and resists between the resisting portion and the bearing secured on the mounting board.

7. The suction device as claimed in claim 1, further comprising a plurality of supporting columns secured between the baseplate and the mounting board, wherein a first end of each supporting column is secured on the first surface, and a second end of each supporting column is secured on the bottom surface.

8. The suction device as claimed in claim 1, further comprising a fixing member fixed to the second surface.

9. The suction device as claimed in claim 1, further comprising a barrel connecting the suction device to a driving device, wherein the mounting board defines a through hole, the barrel passes through the through hole and is secured on the baseplate.

10. A suction device connected to a driving device and a vacuum pump, the suction device comprising:
    a baseplate;
    a mounting board spaced from the baseplate;
    a barrel passing through the mounting board and secured on the baseplate; and
    at least one suction assembly comprising:
        two bearings secured on the baseplate and the mounting board, respectively; and
        a pole being a hollow structure and passing through the two bearings;
    wherein the barrel connects the driving device, a suction head and a connection assembly are coupled to two opposite ends of the pole, the connection assembly connects to the vacuum pump to generate a vacuum in the suction head, the barrel is driven by the driving device to allow the suction head to vacuum-lift workpieces; and
    wherein the baseplate defines a receiving hole, the mounting board defines a mounting hole, the pole passes through the receiving hole and the mounting hole, the baseplate comprises a first surface and a second surface opposite to the first surface, the mounting board comprises a top surface and a bottom surface opposite to the top surface and facing to the first surface of the baseplate, the two bearings are secured on first surface and the top surface, respectively.

11. The suction device as claimed in claim 10, wherein the suction head comprises a suction portion and a positioning block formed on the suction portion, the suction portion defines a plurality of air holes surrounding the positioning block.

12. The suction device as claimed in claim 10, wherein the connection assembly includes a pipe and a fastener, a first end of the pipe is connected to the pole via the fastener, and a second end of the pipe is connected to the vacuum pump.

13. The suction device as claimed in claim 10, wherein each bearing comprises a sleeve and a flange connected to an end of the sleeve, one bearing is secured on the mounting board via the engagement between the flange and the top surface, and the sleeve communicates with the mounting hole, another bearing is secured on the baseplate via the engagement between the flange and the first surface, and the sleeve of the another bearing passes through the receiving hole.

14. The suction device as claimed in claim 13, wherein the pole protrudes a resisting portion resisting the flange secured on the baseplate.

15. The suction device as claimed in claim 14, wherein the suction assembly further comprises a buffering member, the buffering member is a spring spirally wound around the pole, and resists between the resisting portion and the bearing secured on the mounting board.

\* \* \* \* \*